United States Patent [19]

Bettini et al.

[11] 4,373,842
[45] Feb. 15, 1983

[54] PLASTIC-HEADED FASTENER ASSEMBLY

[75] Inventors: John E. Bettini, Elgin; John F. Nelson, New Lenox, both of Ill.

[73] Assignee: Illinois Tool Works Inc., Chicago, Ill.

[21] Appl. No.: 198,686

[22] Filed: Oct. 20, 1980

[51] Int. Cl.³ .......................................... F16B 23/00
[52] U.S. Cl. .................... 411/377; 411/387; 411/407; 411/903
[58] Field of Search ............ 411/377, 373, 371, 429, 411/431, 903, 902, 901, 900, 407, 402, 403, 387

[56] References Cited

U.S. PATENT DOCUMENTS

| 2,676,510 | 4/1954 | Hodell | 411/407 |
| 3,134,290 | 5/1964 | Jentoft | 411/377 |
| 3,411,816 | 11/1968 | Andrews et al. | 411/431 X |
| 3,557,654 | 1/1971 | Weidner, Jr. | 411/378 |
| 3,618,444 | 11/1971 | Kay et al. | 411/373 |
| 3,693,495 | 9/1972 | Wagner | 411/377 |
| 3,897,712 | 8/1975 | Black | 411/373 |
| 4,041,834 | 8/1977 | Herkes et al. | 411/387 |
| 4,154,138 | 5/1979 | Melone | 411/373 |

FOREIGN PATENT DOCUMENTS

| 2398913 | 3/1979 | France | 411/373 |
| 625345 | 6/1949 | United Kingdom | 411/377 |

Primary Examiner—Ramon S. Britts
Attorney, Agent, or Firm—Thomas W. Buckman

[57] ABSTRACT

A plastic-headed fastener assembly has a first outer and a second inner sealing flange. The second flange performs the secondary function of engaging the upper panel of two a member assembly which tends to climb the threads and holding it away from the head. The threads on the fastener can then strip out the hole in this upper panel so that it may return to its position adjacent the second member. This flange prevents damage to the plastic head which can result from friction generated heat.

5 Claims, 4 Drawing Figures

PLASTIC-HEADED FASTENER ASSEMBLY

BACKGROUND AND SUMMARY OF THE INVENTION

The present invention is directed to a fastener with a plastic head assembled therewith. More particularly, the present invention is directed to an improved plastic-headed fastener assembly capable of withstanding the high torques associated with self-drilling and self-tapping fasteners. The plastic head overlies and protects the metal head therebeneath from corrosion, usually has a color which is coordinated with the panel being attached, and is designed so that the rotational torque forces are transmitted by the plastic to metal surfaces as taught in commonly assigned U.S. Pat. No. 4,041,834. U.S. patented application Ser. No. 81,496 filed Oct. 12, 1979, which is also commonly assigned, is directed to an improved plastic-headed fastener assembly making it related to, although it is distinctly different from, the invention of the present application.

A problem has been encountered with the fastener assembly of the abovenoted patent when the assembly is used to drill and/or tap a first relatively thin panel followed by a second comparatively thick member. The tapping of the thin panel is sometimes completed before the completion of the tapping of thicker member. Consequently, the thin panel "climbs" the threads of the fastener coming into engagement with the plastic head. Contact between the plastic and metal for prolonged periods during high-speed rotation creates large amounts of heat due to friction. This heat is sometimes sufficient to cause damage to the plastic head due to melting. Consequently, the fastener assembly may not seat or seal properly and, sometimes, the plastic head may be severely damaged to the point where it will fall off, leaving the metal head unprotected.

The improved assembly overcomes these problems. The plastic head has a first outer sealing flange extending outwardly and downwardly from the metal head which underlies the plastic. A second inner sealing flange extends downwardly a distance exceeding the downward extension of the outer flange and at a position spaced outwardly from the threads by several times the thickness of the thin panel. As the thin panel climbs the threads of the fastener it will engage the second inner sealing flange and its upward motion will be stopped. The edge of the hole will continue to be drawn up inside the second flange causing the hole to be stripped out (i.e., enlarged to a point where thread-engagement is no longer possible). The thin panel is now free to fall back down into contact with the thick member. Even failing this, the thin panel is no longer being drawn into snug, high-friction contact with the pastic head. Therefore, the potential for damage (which by this design, is limited to the area of the second flange) is now dissipated.

These and other features, advantages and objects of the present invention will be more thoroughly understood following a reading of the attached specification when taken in conjunction with the accompanying drawings.

DETAILED DESCRIPTION OF THE INVENTION

Figure 1:
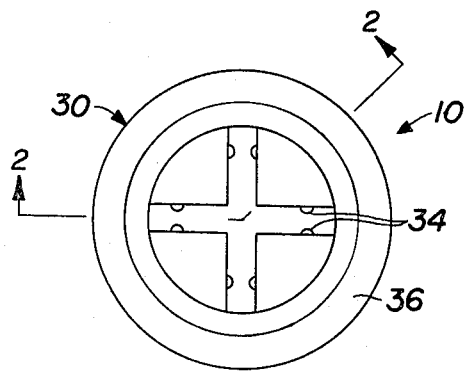
FIG. 1 is a top view of the plastic-headed fastener assembly of the present invention.

The plastic-headed fastener assembly of the present invention is shown generally at 10. The assembly includes a metallic threaded fastener 20 and a plastic head 30. Shank 22 has at least one helical thread 24 thereon. The head 26 of the threaded fastener includes four generally triangular posts 28 which absorb the rotational torque forces generated in drilling and tapping the screw. Although the metallic fastener 20 has been depicted as a self-drilling and self-tapping fastener, it will be appreciated that the teachings of the present invention are also applicable to thread-cutting and thread-forming screws.

Figure 2:
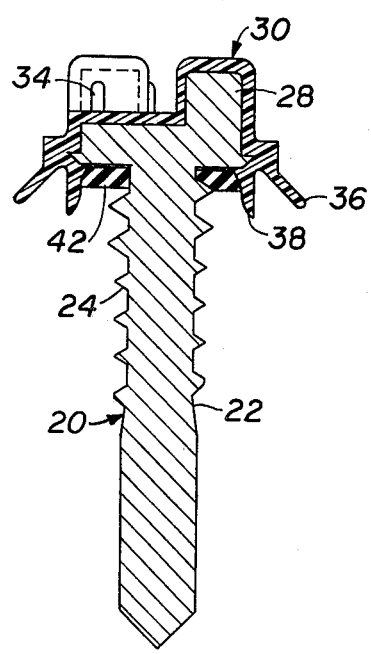
FIG. 2 is a lateral cross-sectional view taken along line 2—2 in FIG. 1.
Figure 4:
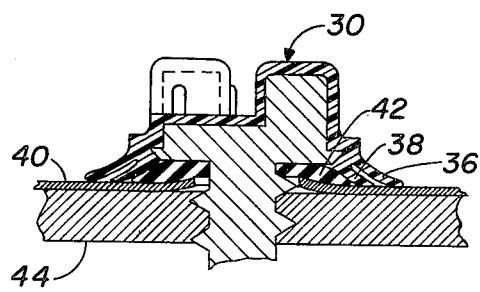
FIG. 4 is a partial cross section showing the plastic head in its seated position.

The plastic head 30 has four recesses 32 which are configured to receive posts 28. This head 30 may be molded onto the head of the fastener, ultrasonically welded thereto or affixed thereon in whatever manner desired. The exterior of the plastic head has a plurality of protrusions 34 formed on the lateral faces of the post covering portions. These protrusions engage the blades of a driver bit (not shown) improving the fit and providing some bit-gripping action. A first outer sealing flange 36 extends downwardly (as seen in FIG. 2) a first axial distance and outwardly from the plastic head in the vicinity of the edge of the underlying metallic head 26. A second inner flange 38 extends downwardly a second axial distance greater than the first axial distance. This flange 38 is spaced radially outwardly from fastener thread 24 by several times the thickness of panel 40 (FIG. 3) with which the fastener assembly is to be used. A neoprene or other elastomeric washer 42 may be used to protect the undersurface of the head 26 from moisture and corrosion.

Figure 3:
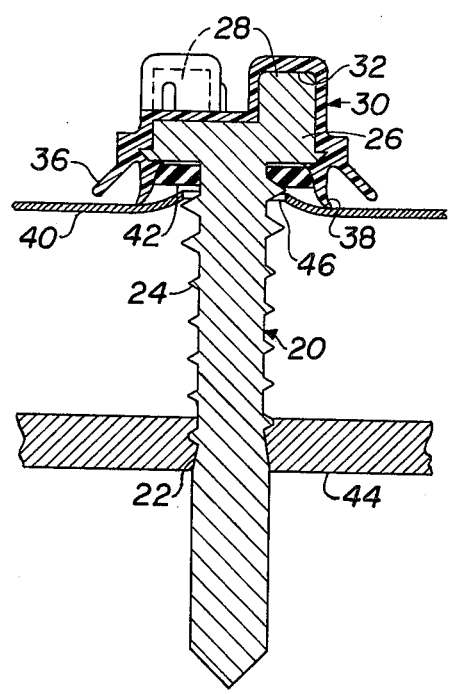
FIG. 3 is a lateral cross section similar to FIG. 2 showing the fastener in use.

As best seen in FIG. 3, when threading has been completed in the thin panel 40 but is continuing in member 44, panel 40 will tend to climb threads 24 toward the head 26. The inner sealing flange 38 engages the upper surface of panel 40 and prevents further upward movement. The inner edge of aperture 46 will continue to be drawn up inside of flange 38 until it exceeds the maximum diameter of thread 24. When this occurs, panel 40 will no longer be pulled snugly against plastic head 30 and may, in fact, fall back into overlying engagement with member 44. When threading of member 44 is finished and fastener head 26 fully seated, flanges 36 and 38 will be flattened into sealing engagement with panel 40 as will be washer 42, when used.

By its configuration, the plastic-headed fastener assembly improves its sealing performance and increases reliability of corrosion resistance by eliminating the possibility of damage to the plastic head which was caused by friction heating in previous designs.

Various changes, modifications and alterations will become apparent to a person of ordinary skill in the art following a reading of the aforegoing specification. Accordingly, it is intended that all such changes, modifications and alterations as come within the scope of the appended claims be considered part of the present invention.

I claim:

1. A plastic-headed fastener assembly for use in attaching a first panel of a first thickness to a second substantially thicker member comprising a metal screw fastener having a threaded shank and having a head at one end thereof, said head having rotation inducing surfaces, the threads beneath the head having a first outside diameter; a plastic head member overlying the metallic head and being affixed thereto, said plastic head mating with and transmitting the rotational forces to the metallic head, a first outer sealing flange of the plastic head member extending outwardly and downwardly from the edge of the underlying metallic head, said downward extent being for a first axial distance relative to the screw, a second inner sealing flange extending generally downwardly and substantially parallel to the axis of said fastener for a second axial distance relative to the screw, said second axial distance being substantially greater than said first axial distance, the second sealing flange having an inside diameter which is greater than said first outside diameter by at least several times the first panel thickness whereby said second sealing flange acts to prevent the creation of significant friction between the plastic head member and the panel being attached by allowing said fastener to easily strip out a hole in said first panel before fully engaging said second member.

2. The plastic-headed fastener assembly of claim 1 including an elastomeric sealing washer positioned within said second sealing flange and retained by the threaded fastener shank.

3. The plastic-headed fastener assembly of claim 1 wherein the threaded fastener comprises a self-drilling, self-tapping fastener.

4. The plastic-headed fastener assembly of claim 1 wherein the rotation inducing surfaces comprises eight vertical walls of four post-like members.

5. The plastic-headed fastener assembly of claim 4 wherein the plastic head portions overlying said eight vertical walls have protrusions thereon to improve the gripping performance with respect to a driving tool used therewith.

* * * * *